United States Patent [19]

Sato

[11] Patent Number: 5,581,581
[45] Date of Patent: Dec. 3, 1996

[54] VITERBI EQUALIZER

[75] Inventor: Teruo Sato, Kanagawa, Japan

[73] Assignee: Sony Corporation, Tokyo, Japan

[21] Appl. No.: 565,884

[22] Filed: Dec. 1, 1995

Related U.S. Application Data

[63] Continuation of Ser. No. 140,454, Oct. 25, 1993, abandoned.

[30] Foreign Application Priority Data

Oct. 27, 1992 [JP] Japan ................................. 4-289076

[51] Int. Cl.⁶ .................................................. H04L 27/06
[52] U.S. Cl. ............................ 375/341; 375/262; 375/349
[58] Field of Search .................................. 375/229, 231,
375/262, 266, 341, 348, 349, 354; 371/42,
43, 46; 364/724.2

[56] References Cited

U.S. PATENT DOCUMENTS

| | | | |
|---|---|---|---|
| 5,091,918 | 2/1992 | Wales | 375/341 |
| 5,204,878 | 4/1993 | Larsson | 375/94 |
| 5,285,480 | 2/1994 | Chennakeshu et al. | 375/101 |
| 5,349,607 | 9/1994 | Moreno | 375/94 |

FOREIGN PATENT DOCUMENTS

| | | | |
|---|---|---|---|
| 0496152A3 | 7/1992 | European Pat. Off. | H04L 25/30 |
| 0529585 | 3/1993 | European Pat. Off. | 375/341 |
| 0551803A1 | 7/1993 | European Pat. Off. | H04J 3/06 |

OTHER PUBLICATIONS

Second IEE National Conference on Telecommunications, York, GB, Apr. 2–5, 1989, L. B. Lopes; "Performance of Viterbi Equalizers for the GSM System", pp. 61–66.

IEE Proceedings—I, vol. 138, No. 4, Aug., 1991, A. Reichman, "Adaptive Detection Using Least–Square Filters", pp. 239–246.

Sixth International Conference on Mobile Radio and Personal Communications, Dec. 9–11, 1991, E. Dahlman, "Improved Adaptive Viterbi–Detectors for Fast–Varying Mobile–Radio Channels", pp. 21–25.

*Primary Examiner*—Stephen Chin
*Assistant Examiner*—Don Vo
*Attorney, Agent, or Firm*—Hill, Steadman & Simpson

[57] ABSTRACT

A Viterbi equalizer can provide an accurate equalizing characteristic. This Viterbi equalizer comprises a synchronizing signal data detecting circuit for detecting a synchronizing signal data portion from a reception signal data series, a transmission line characteristic estimating circuit for modelling an impulse response between a transmitter and a receiver by comparing a synchronizing signal data detected by the synchronizing signal data detecting circuit with a reference signal, and a decoding circuit for decoding a transmission data series by using a Viterbi algorithm on the basis of a transmission model obtained from the transmission line characteristic estimating circuit.

5 Claims, 9 Drawing Sheets

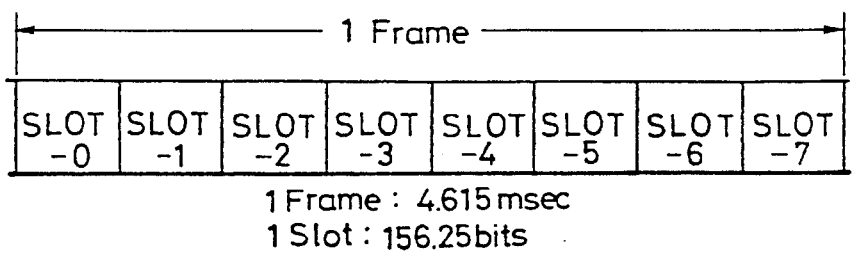
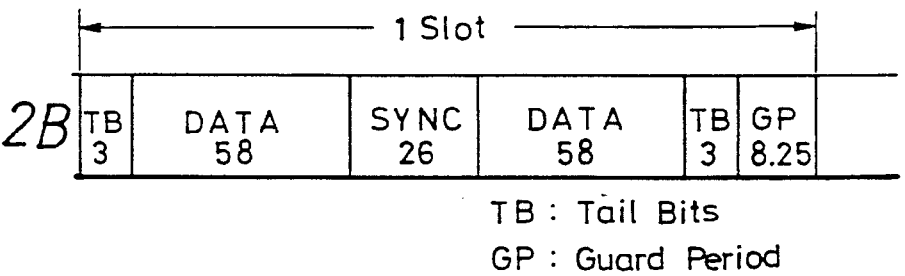
FIG. 3
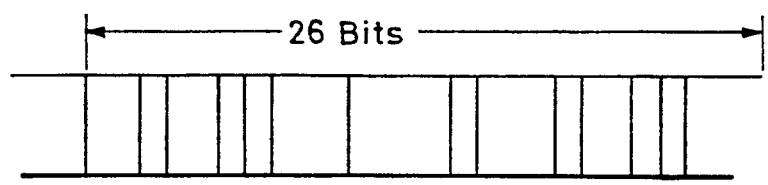

FIG. 4

| TIME BASE | CHANNEL RESPONSE (hi) | SYNC (x) | RECEPTION SIGNAL (y) | CROSS-CORRELATION FUNCTION (x✦y) | AUTO-CORRELATION FUNCTION (x) |
|---|---|---|---|---|---|
| -15 | | | -0.80000 | -0.08077 | -0.03846 |
| -14 | | | -0.80000 | 0.03846 | -0.07692 |
| -13 | | -1.00000 | -0.20000 | -0.08077 | -0.03846 |
| -12 | | -1.00000 | -1.80000 | -0.02308 | 0.0 |
| -11 | | 1.00000 | -0.10000 | 0.04231 | -0.03846 |
| -10 | | -1.00000 | -0.50000 | -0.30769 | 0.0 |
| -9 | | -1.00000 | -1.50000 | 0.19615 | 0.11538 |
| -8 | | 1.00000 | 1.50000 | -0.38462 | -0.38462 |
| -7 | | -1.00000 | -0.50000 | 0.11923 | 0.11538 |
| -6 | | 1.00000 | -2.10000 | -0.17692 | 0.0 |
| -5 | | 1.00000 | -0.10000 | 0.08846 | -0.03846 |
| -4 | | 1.00000 | 0.50000 | -0.07692 | -0.07692 |
| -3 | | -1.00000 | -1.50000 | 0.07308 | 0.11538 |
| -2 | 0.80000 | -1.00000 | -1.50000 | 0.77692 | 0.0 |
| -1 | 0 | -1.00000 | -0.50000 | -0.03462 | -0.03846 |
| 0 | 1.00000 | -1.00000 | -2.10000 | 1.00000 | 1.00000 |
| 1 | 0 | 1.00000 | -0.10000 | 0.04231 | -0.03846 |
| 2 | 0.30000 | -1.00000 | -2.10000 | 0.23846 | 0.0 |
| 3 | | -1.00000 | 0.10000 | 0.07308 | 0.11538 |
| 4 | | -1.00000 | -2.10000 | -0.07692 | -0.07692 |
| 5 | | 1.00000 | -0.10000 | 0.08846 | -0.03846 |
| 6 | | -1.00000 | -0.50000 | -0.33077 | 0.0 |
| 7 | | -1.00000 | -1.50000 | 0.19615 | 0.11538 |
| 8 | | 1.00000 | 1.50000 | -0.38462 | -0.38462 |
| 9 | | -1.00000 | -0.50000 | 0.11923 | 0.11538 |
| 10 | | 1.00000 | 2.10000 | -0.11538 | 0.0 |
| 11 | | 1.00000 | 0.70000 | -0.03462 | -0.03846 |
| 12 | | 1.00000 | 1.30000 | -0.06154 | 0.0 |
| 13 | | | 0.30000 | -0.08077 | -0.03846 |
| 14 | | | 0.30000 | 0.23077 | -0.07692 |
| 15 | | | | -0.08077 | -0.03846 |

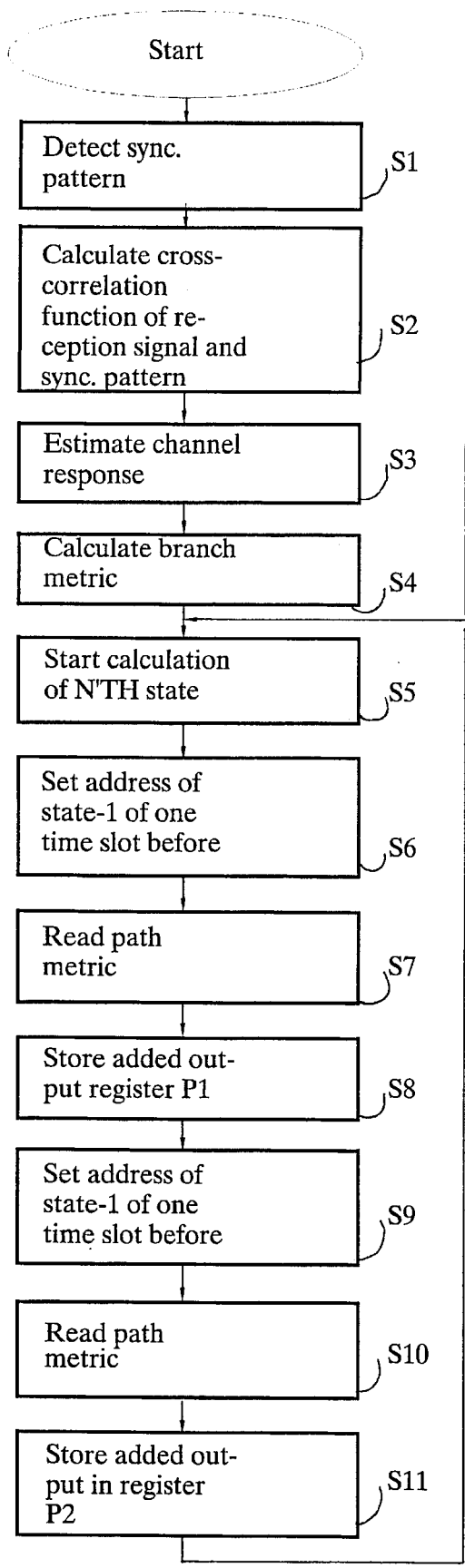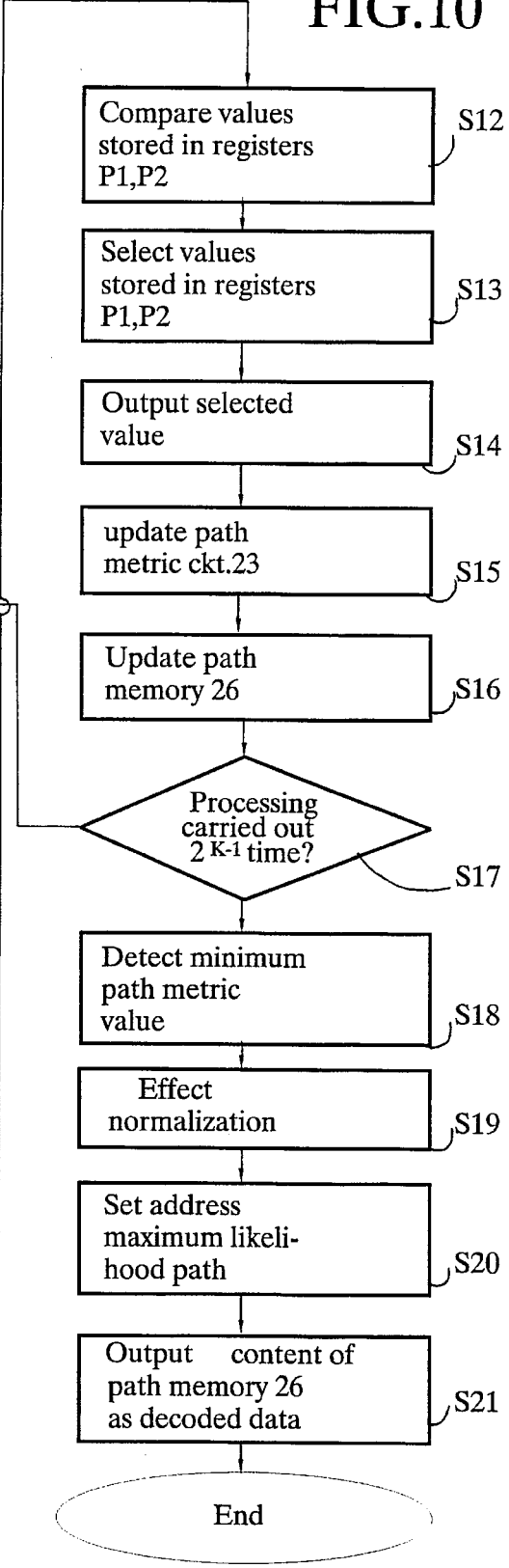
FIG.10

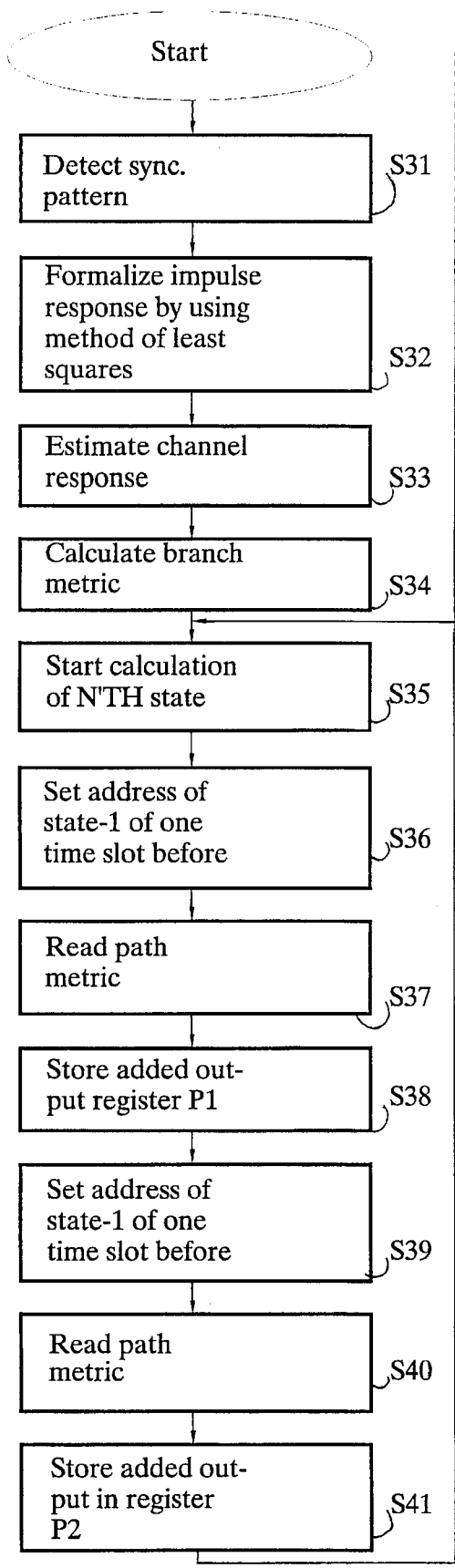
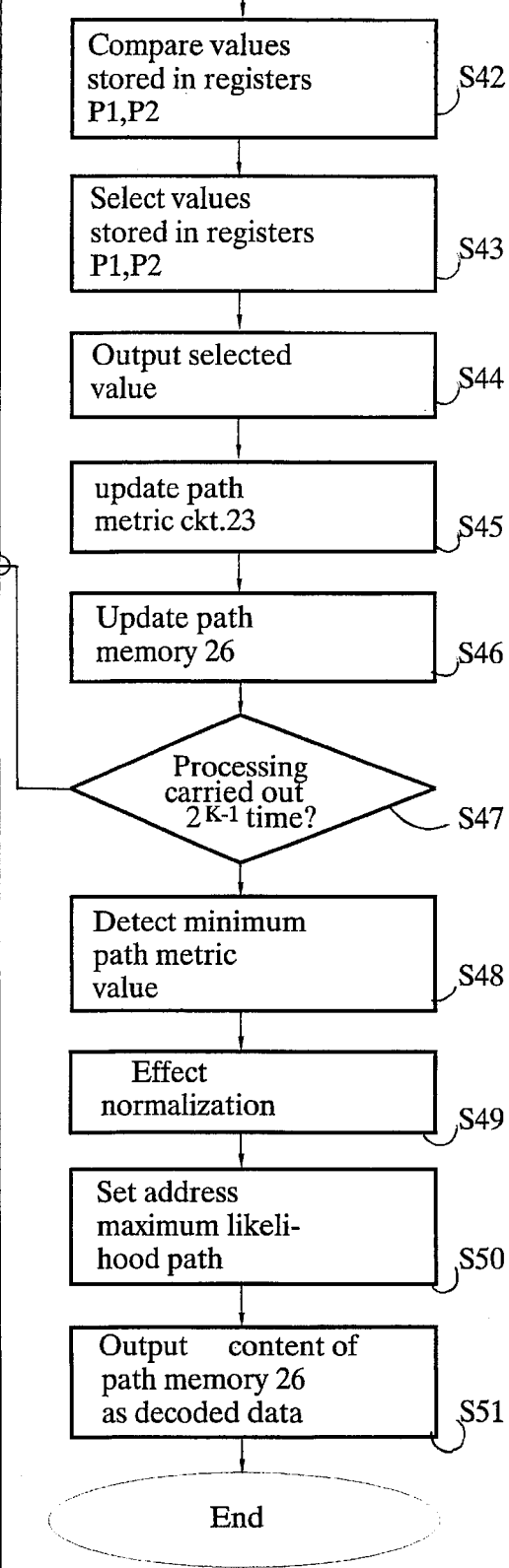
FIG.11

VITERBI EQUALIZER

This is a continuation of application Ser. No. 08/140,454, filed Oct. 25, 1993, which is now abandoned.

BACKGROUND OF THE INVENTION

1. Field of the Invention

The present invention relates to a Viterbi equalizer for use in a mobile telephone or the like, for example.

2. Description of the Prior Art

Heretofore, the development of digital mobile telephones has advanced in U.S., European countries and Japan. A mobile communication system such as the mobile telephone or the like is affected by a so-called multipath propagation because a highrise building or the like is located between a high-speed mobile station such as an automobile and a base station, so that a transmission characteristic between the base station and the mobile station is deteriorated considerably. Therefore, a data transmission with less error is impossible. In addition, such an equivalent transmission characteristic fluctuates with time.

In the above-mentioned mobile communication system, in order to realize a reception with less error, an equalizing technique for correcting the above transmission characteristic becomes indispensable.

Japanese laid-open patent publication No. 4-183041 describes as a conventional equalizing technique a Viterbi equalizer in which transmission data is decoded by using a transmission characteristic provided between the base station and the mobile station on the basis of a maximum likelihood sequence estimation.

More specifically, according to an example of the prior art, in a Viterbi decoder in which a maximum likelihood reception is carried out following a time fluctuation of a characteristic of a transmission line, there is provided a Viterbi decoder which comprises a register for storing a plurality of sample values of a reception signal, a transmission line characteristic calculating circuit for receiving the plurality of sample values from the above register and estimating respective transmission line characteristics relative to a plurality of sequences, a branch metric calculating circuit for calculating distances of the plurality of samples by calculating hypothetical signal reception points relative to the respective sequences from the transmission line characteristics calculated by the transmission line calculating circuit and a Viterbi processor supplied with an output of the branch metric calculating circuit and judging a received signal on the basis of a Viterbi algorithm. According to this conventional Viterbi decoder, however, since a plurality of sample values of the received signal are compared, it cannot be expected that the transmission characteristic between a transmitter and a receiver is estimated accurately.

OBJECTS AND SUMMARY OF THE INVENTION

Therefore, it is an object of the present invention to provide an improved Viterbi equalizer in which the aforesaid shortcomings and disadvantages encountered with the prior art can be eliminated.

More specifically, it is another object of the present invention to provide a Viterbi equalizer in which a transmission line characteristic can be estimated by using a synchronizing signal pattern.

It is a further object of the present invention to provide a Viterbi equalizer in which a transmission line characteristic between a transmitter and a receiver can be accurately estimated by using a method of least squares.

According to an aspect of the present invention, there is provided a Viterbi equalizer which is comprised of a synchronizing signal data detecting circuit for detecting a synchronizing signal data portion from a reception signal data series, a transmission line characteristic estimating circuit for modelling an impulse response between a transmitter and a receiver by using synchronizing signal data detected by the synchronizing signal data detecting circuit and a reference signal, and a decoding circuit for decoding a transmission data series by using a Viterbi algorithm on the basis of a transmission model obtained from the transmission line characteristic estimating circuit.

According to another aspect of the present invention, there is provided a Viterbi equalizer which is comprised of a synchronizing signal data detecting circuit for detecting a synchronizing signal data portion from a reception signal data series, a transmission line characteristic estimating circuit for modelling an impulse response between a transmitter and a receiver by using a method of least squares on the basis of synchronizing signal data detected by the synchronizing signal data detecting circuit used as a reference signal, and a decoding circuit for decoding a transmission data series by using a Viterbi algorithm on the basis of a transmission model obtained from the transmission line characteristic estimating circuit.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 2A and 2B are diagrams used to explain arrangements of frame and slot of a communication channel of a so-called GSM (group special mobile) system, respectively;

FIG. 3 is a diagram showing an example of a data series used in the present invention;

FIG. 4 is a diagram used to explain the present invention;

FIG. 10 is a flowchart to which references will be made in explaining operation of a Viterbi equalizer according to a first embodiment of the present invention; and FIG. 11 is a flowchart to which references will be made in explaining operation of the Viterbi equalizer according to a second embodiment of the present invention.

DETAILED DESCRIPTION OF THE PREFERRED EMBODIMENTS

A Viterbi equalizer according to embodiments of the present invention will hereinafter be described with reference to the drawings.

Figure 1:
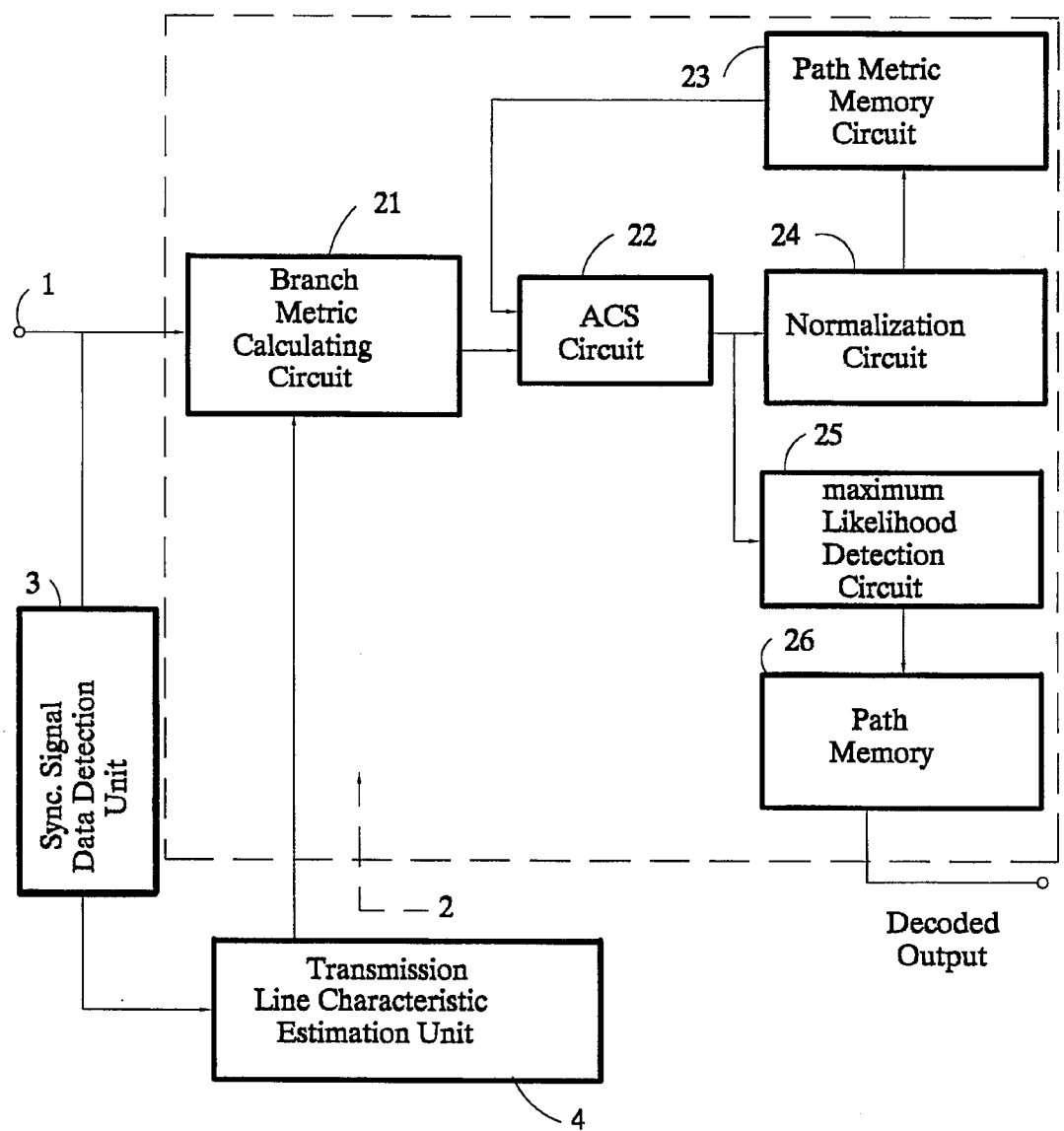
FIG. 1 is a block diagram showing a fundamental circuit arrangement of a Viterbi equalizer according to an embodiment of the present invention.

FIG. 1 shows a fundamental circuit arrangement of a Viterbi equalizer according to an embodiment of the present invention. In this embodiment, the Viterbi equalizer shown in FIG. 1 is applied to a GSM (group special mobile) system that is adopted by mobile telephone systems used in European countries.

As shown in FIG. 1, a reception signal supplied to an input terminal 1 is supplied to a branch metric calculating circuit 21 which is part of a Viterbi estimation unit 2: also the reception signal is supplied to a synchronizing (sync.) signal data detection unit 3. Sync. signal data from the sync. signal data detection unit 3 is supplied to a transmission line characteristic estimation unit 4.

A communication channel from the base station to the mobile station (automobile) according to the GSM system adopted in European countries has a frame arrangement shown in FIGS. 2A and 2B. Since each time slot is added at its central portion with a synchronizing signal pattern (SYNC pattern) having a well-known pattern as shown in FIG. 2B and then transmitted, the transmission line characteristic estimation unit 4 estimates an impulse response (hereinafter referred to as a channel response) interposed between the transmitter and the receiver by utilizing this sync. pattern.

The GSM system uses a GMSK (Gaussian Minimum Shift Keying) modulation system. In this case, a signal of the high frequency transmission system is converted into a baseband signal by a demodulator and therefore the present invention will hereinafter be described as the signal processing in the base band.

In the GSM system, there are designated in advance 8 kinds of data series one of those data series is illustrated in FIG. 3. A conventional procedure for modelling the channel response by utilizing such a sync. pattern will be described.

Now, the case that a channel response is presented as shown in FIG. 4 will be described by way of example (this channel response is unknown in actual practice). In FIG. 4, the unit of the time base direction is equal to a symbol transmission interval. The sync. pattern in FIG. 4 is the sync. pattern of FIG. 3. Sync. data that will be received when the reception signal passes the transmission system having such a channel response is expressed by the following equation (1):

$$y_i = \sum_{n=-k}^{+k} h_n \cdot x_{i-n} \quad (1)$$

where $y_i$ is the reception signal, $x_i$ is the sync. pattern, and $h_i$ is the channel response. These values are those that were sampled by the sample time interval T, respectively.

When a reception signal corresponding to a sync. pattern portion is calculated in accordance with the equation (1), then there is obtained an output signal shown in FIG. 4. On the receiver side, known information are the sync. pattern $x_i$ and the reception signal $y_i$.

In the conventional processing procedure of modelling in the transmission line characteristic estimation unit 4, the sync. data portion is detected by correlating the reception signal with the sync. pattern.

Then, a cross-correlation function $r_j$ between the sync. signal data portion and the sync. signal pattern is calculated by the following equation (2):

$$r_j = \sum_{n=-1}^{+m} x_n \cdot y_{n+j} \quad (2)$$

Then, a normalization is carried out by using a maximum value of this cross-correlation function $r_j$. Cross-correlation functions thus calculated are illustrated in FIG. 4.

The channel response is estimated by this cross-correlation function and an estimated value is supplied to the branch metric calculating circuit 21.

Figure 5:
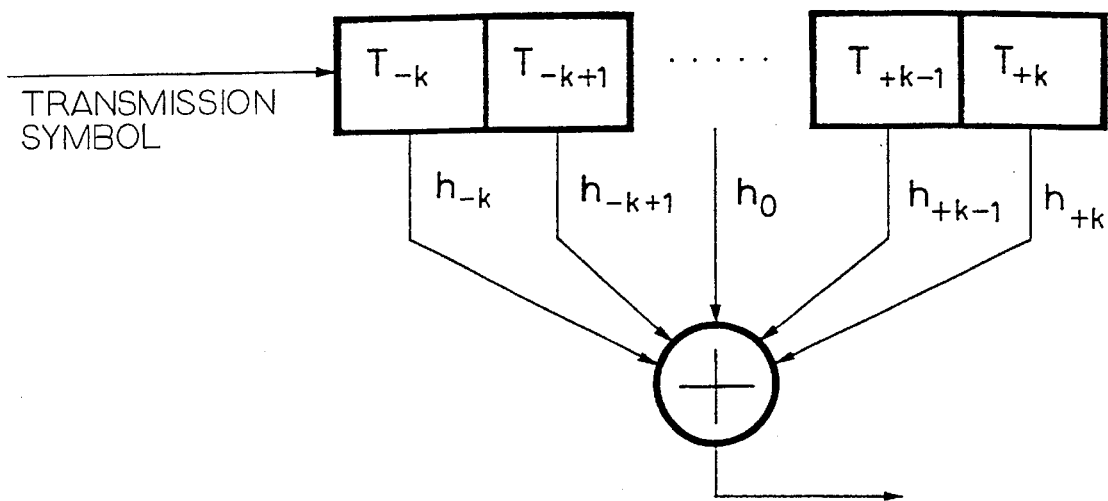
FIG. 5 is a block diagram showing a generalized transmission line equivalent model.
Figure 6:
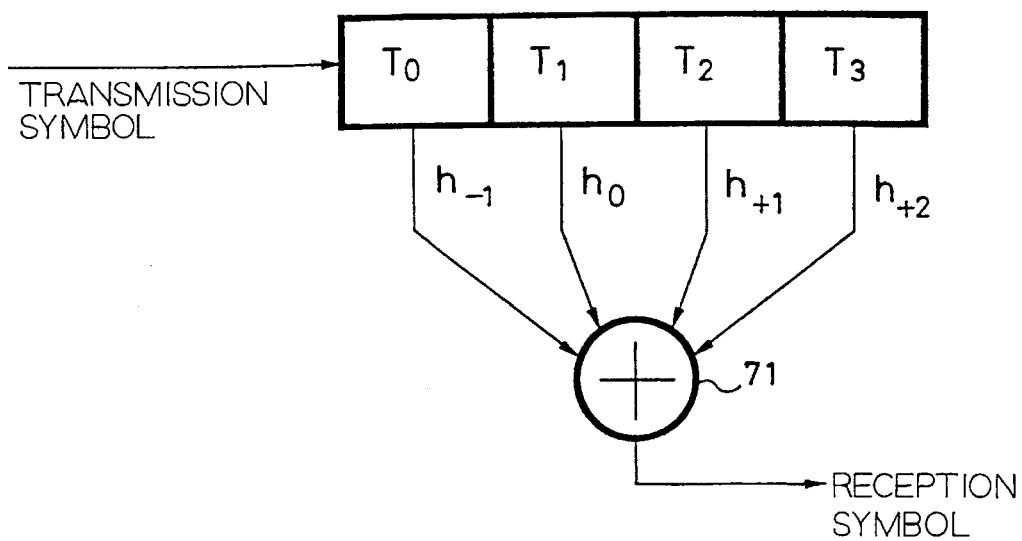
FIG. 6 is a block diagram showing a specific transmission line equivalent model.

After the channel response was estimated, transmission data series is decoded by using a Viterbi algorithm. FIG. 5 shows a generalized transmission line equivalent model. An example of a transmission line equivalent model in which the generalized transmission line equivalent model of FIG. 5 is practically arranged under the condition that the channel response length is limited will be described with reference to FIG. 6. If the transmission line equivalent model is arranged as shown in FIG. 6, such a transmission line equivalent model can be regarded as a convolutional encoder in which a constraint length is 4 and a coding ratio r is 1/1. This convolutional encoder is different from an ordinary convolutional encoder in that an adder 71 carries out a linear operation, symbols that are input to shift registers $T_0$, $T_1$, $T_2$ and $T_3$ are two values of <+1> and <-1> and respective outputs of the shift registers $T_0$, $T_1$, $T_2$ and $T_3$ are weighted by weighting amounts corresponding to channel responses $H_{-1}$, $h_0$, $h_{+1}$ and $h_{+2}$ and which are then added together by the adder 71.

A symbol G that is transmitted when the transmission line equivalent model is arranged as shown in FIG. 6, is expressed by the following equation (3):

$$\begin{aligned} G &= \sum_{n=-1}^{+2} h_n <T_{n+1}> \\ &= h_{-1}<T_0> + h_0<T_1> + h_{+1}<T_2> + \\ &\quad h_{+2}<T_3> \end{aligned} \quad (3)$$

where $<T_j>$ represents the content stored in a register $T_j$.

Figure 7:
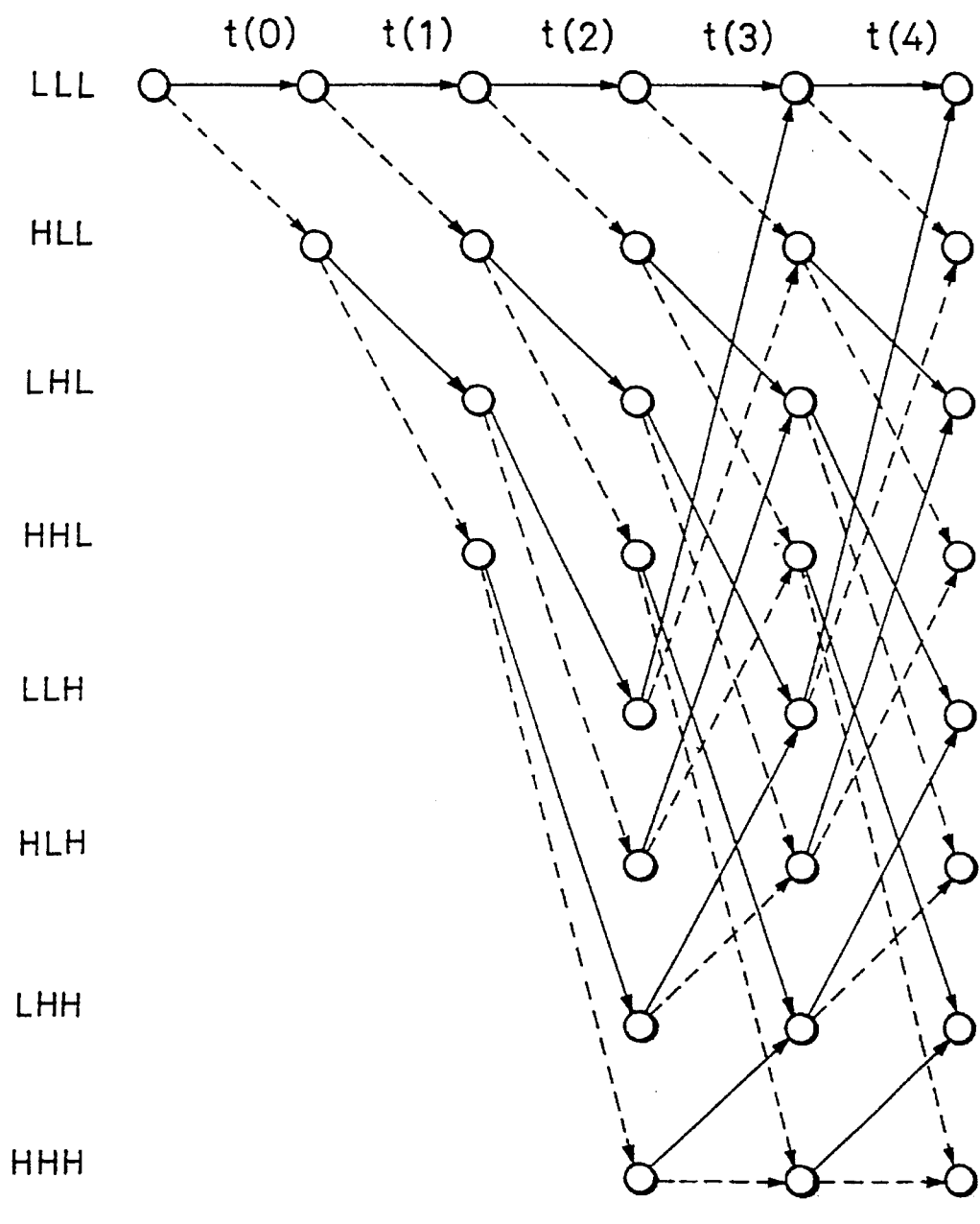
FIG. 7 is a diagram showing a trellis expression.

FIG. 7 is a trellis diagram showing the transition of the internal state of the transmission line in the transmission equivalent model shown in FIG. 6. Three alphabets corresponding to respective state nodes $S_i$ in FIG. 7 represent internal states of the shift register in each time slot. The shift register takes values of <+1> and <-1> and these values are expressed as H and L for simplicity. Modifying the ordinary trellis diagram, FIG. 7 shows the state that a transition shown by a solid line occurs when an information input symbol <-1> is input and a transition shown by a broken line occurs when an information input symbol <+1> is input.

Reception signal data $Y_k$ is input to the branch metric calculating circuit 21, which then calculates a likelihood concerning the transition. While some calculations for calculating a likelihood have been proposed so far, a Humming distance that is the most general evaluation measure in the Viterbi decoder is applied in a broad sense.

A branch metric in time slot t(k) is calculated by the following equation (4):

$$b(k, S_i \to S_n) = |Y_k - G_k| \quad (4)$$

where $Y_k$ is the reception signal data and $G_k$ is the symbol transmitted from the equivalent transmission line model. $G_k$ takes the value calculated by the foregoing equation (3).

The branch metric obtained in the branch metric calculating circuit 21 is supplied to an ACS (Add Compare Select) circuit 22. The ACS circuit 22 is comprised of an adder, a comparator and a selector. The ACS circuit 22 adds the branch metric and a path metric of one time slot before stored in a path metric memory circuit 23 and selects a smaller value as a remaining path. The path metric is a value which results from adding branch metrics in the remaining path.

An output signal of the ACS circuit 22 is supplied through a normalization circuit 24 to the path metric memory circuit 23, and the output signal of the ACS circuit 22 is supplied to a maximum likelihood path detection circuit 25.

The maximum likelihood path detection circuit 25 detects a path having a minimum path metric value and outputs the content corresponding to the detected path and stored in a path memory 26 as decoded data. The path memory 26 estimates and stores therein information bit series.

Figure 8:
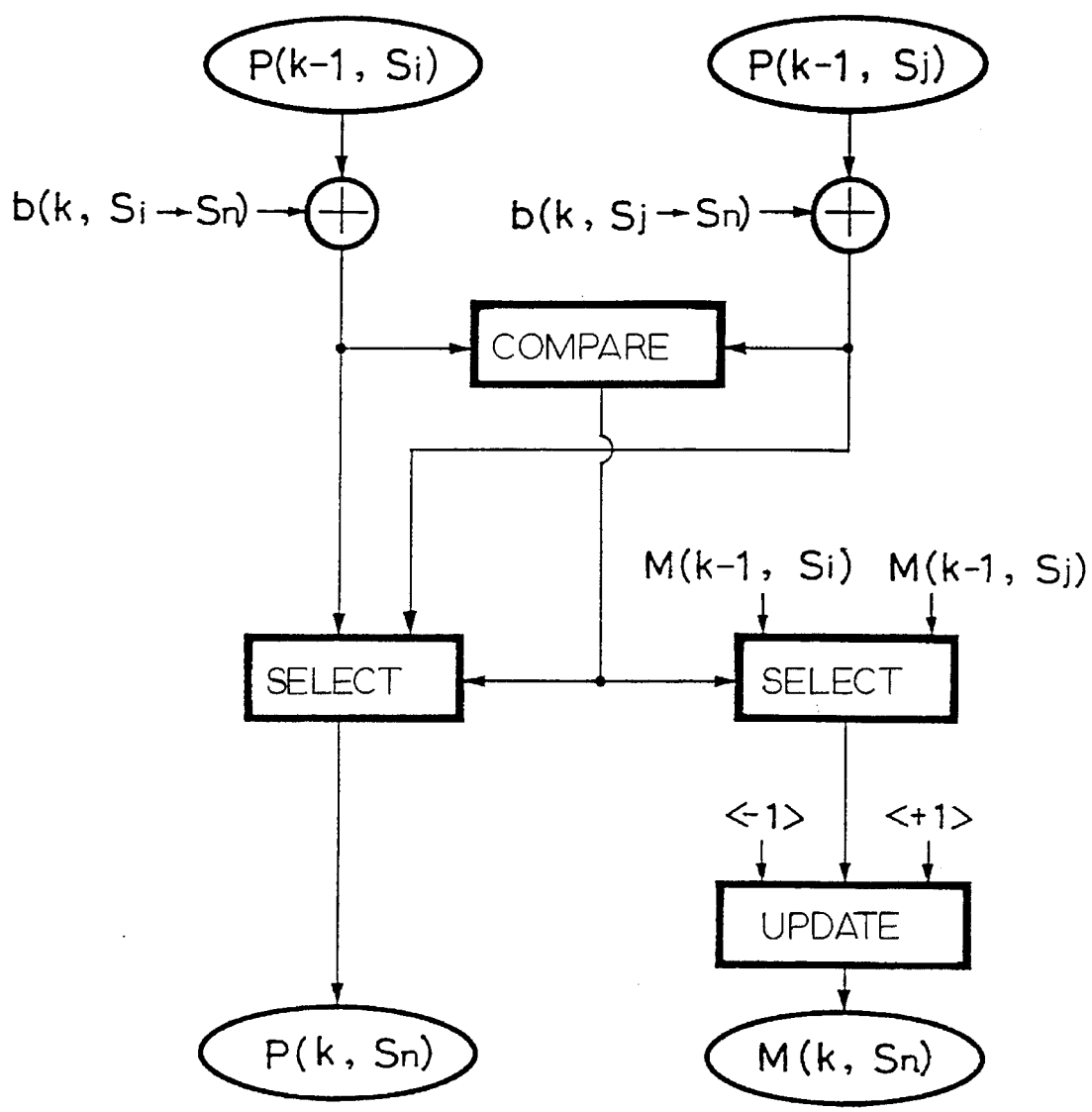
FIG. 8 is a block diagram showing a logical unit of the Viterbi equalizer.

FIG. 8 shows a logical unit which constructs the Viterbi equalizer. In FIG. 8, calculated amounts express the following contents, respectively.

$P(k-1, S_i)$: path metric having a remaining path which reaches the state node $S_i$ in time slot $t(k-1)$ $P(k-1, S_j)$: path metric having a remaining path which reaches the state node $S_j$ in time slot $t(k-1)$ $b(k, S_i \rightarrow S_n)$: branch metric corresponding to a transition from the state node $S_i$ to the state node $S_n$ in time slot $t(k)$ $b(k, S_j \rightarrow S_n)$: branch metric corresponding to a transition from the state node $S_j$ to the state node $S_n$ in time slot $t(k)$ $M(k-1, S_i)$: path memory owned by the remaining path reaching the state node $S_i$ in time slot $t(k-1)$ $M(k-1, S_j)$: path memory owned by the remaining path reaching the state node $S_k$ in time slot $(k-1)$ $<-1>, <+1>$: information symbols that are estimated to be transmitted in time slot $t(k)$ $P(k, S_n)$: path metric owned by the remaining path reaching the state node $S_n$ in time slot $t(k)$ $M(k, S_n)$: path memory owned by the remaining path reaching the state node $S_n$ in time slot $t(k)$ If the constraint length is taken as k, then there exist $2^{k-1}$ states so that the logical units shown in FIG. 8 corresponding to the states $2^{k-1}$ are required fundamentally.

The scale of the path metric memory circuit 23 is reduced by providing the normalization circuit 24 similarly to the block arrangement of the Viterbi equalizer shown in FIG. 1. Also, an overflow that takes place when the path metric is calculated can be avoided.

As a practical normalization processing, the minimum value of the path metric is detected and the detected value is subtracted from each path metric amount. Accordingly, there exist $2^{k-1}$ remaining paths thus selected similarly to the $2^{k-1}$ states.

Figure 9:
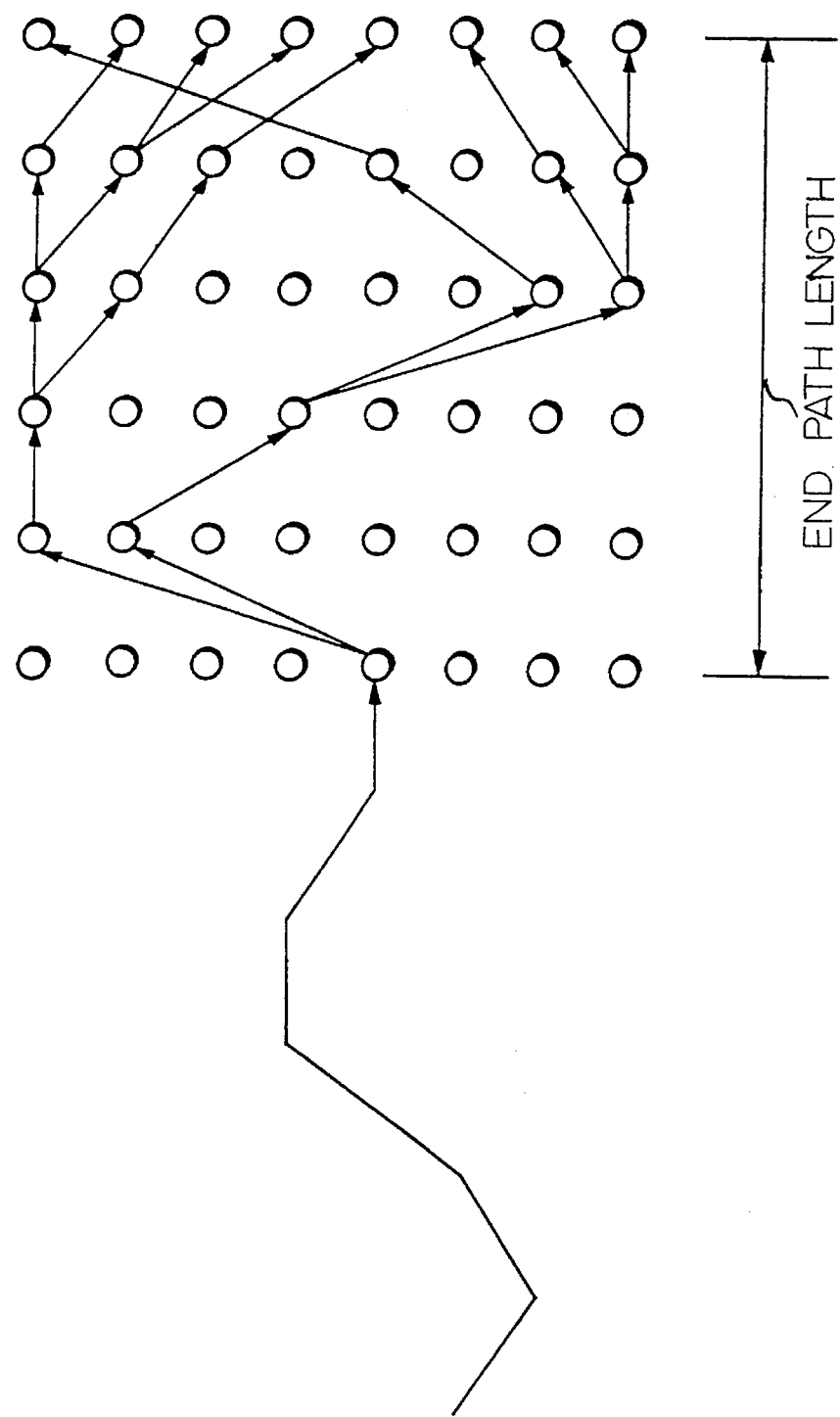
FIG. 9 is a diagram used to explain a metric calculation and a remaining path.

In each time slot, an operation for selecting the remaining path and an operation for updating a path metric corresponding to the path and the path memory 26 are repeated. It is known that, if the above operations are carried out for a sufficiently long time, then the remaining paths are merged to the same path. FIG. 9 shows such a state. A length in which the path is merged from the latest processing time point is called an end path length.

How to update the path memory of FIG. 8 is determined depending on the respective states. For example, in the logical unit of "LLL", $<-1>$ is determined. In the logical unit "HLL", $<+1>$ is determined. Respective values will hereinafter be determined similarly.

In the maximum likelihood judgement, the path having the minimum path metric is detected and the content of the path memory corresponding to the detected path is output as an information symbol of a timing point advanced by an amount of the end path length (about three to four times the constraint length in general).

A signal processing flow of this Viterbi equalizer will be described with reference to a flowchart forming FIG. 10.

Referring to FIG. 10, following the start of operation, when the reception signal data $Y_k$ is supplied to the input terminal 1, the sync. pattern is detected at step S1. Then, the processing proceeds to step S2, whereat a cross-correlation function of the sync. pattern of the reception signal data $Y_k$ and the sync. pattern previously stored is calculated by the transmission line characteristic estimation unit 4 to thereby estimate the channel response (step S3). Then, the branch metric calculating circuit 21 calculates the branch metric in step S4, and the processing proceeds to step S5, where the calculation of N'th state is started.

In step S6, an address of a state-1 that is one time slot before is set. Then, the processing proceeds to step S7, where the path metric stored in the path metric memory circuit 23 at its address thus set is read out. Then, the read out path metric and the branch metric calculated at step S4 are added by the ACS circuit 22 and the added output is stored in a register P1 in step S8.

In step S9, an address of a state-2 of one precious time slot is set. Then, the processing proceeds to step S10, where a path metric stored in the path metric memory circuit 23 at its set address is read out. In the next step S11, this path metric is added to the branch metric calculated at step S4 by the ACS circuit 22, and the added output is stored in a register P2.

In the next steps S12 and S13, the values stored in the registers P1, P2 are compared and selected by the ACS circuit 22. Then the value thus selected is output at step S14. In step S15, the path metric memory circuit 23 is updated by this selected value, and the path memory 26 is also updated by this selected value at step S16.

In the next decision step S17, it is determined whether or not the processing from step S5 to S16 is carried out $2^{k-1}$ times. If a NO is output at decision step S17, then the processing returns to step S5. If on the other hand a YES is output at decision step S17, then the processing proceeds to step S18, where a path having the minimum path metric value is detected by the maximum likelihood path detection circuit 25. In the next step S19, a normalization is effected by subtracting the minimum value of the path metric from each of the path metric amounts.

In step S20, an address of a maximum likelihood path is set by the maximum likelihood detection circuit 25. In the next step S21, the content of the path memory 26 is output as decoded data.

Comparing the channel response and the cross-correlation function $r_j$ shown in FIG. 4, it can be confirmed that the channel response can be estimated with a certain accuracy, whereas it is unavoidable that a "false impulse response" that should not appear also is detected. A cause for this lies in an autocorrelation function $a_j$ of the sync. pattern. This autocorrelation function $a_j$ is expressed by the following equation (5):

$$a_j = \sum_{n=-1}^{+m} x_n \cdot x_{n+j} \qquad (5)$$

Autocorrelation functions thus calculated are illustrated in FIG. 4. Study of FIG. 4 reveals that there exist several peaks having a considerably large level in addition to the main peak. There is then the risk that an accuracy required when the channel response is estimated is deteriorated by the above-mentioned peaks.

According to another embodiment of the present invention, since the sync. data is used as a reference signal and the impulse response between the transmitter and the receiver is modelled by using the least squares method, the impulse response between the transmitter and the receiver can be uniquely modelled. The model thus determined is a model whose error becomes minimum in a sense of the least squares estimation, which as a result can provide a satisfactory equalizing characteristic.

In accordance with the second embodiment of the present invention, the transmission line characteristic estimation unit 4 shown in FIG. 1 is arranged as follows. The transmission line equivalent model is formed as the channel response as shown in FIG. 5. If so, the signal $Y_i$ that is predicted to be received is expressed by the aforementioned equation (1).

On the other hand, expressing the signal $Y_i$ that is actually received, an error $\epsilon$ concerning the i'th symbol is expressed by the following equation (6):

$$\epsilon_i = y_i - y_i \quad (6)$$

Calculating a square sum E of this error $\epsilon_i$, we have:

$$E = \sum_{i=-1}^{+m} \epsilon_i^2 \quad (7)$$

$$= \sum_{i=-1}^{+m} \left\{ \sum_{n=-k}^{+k} h_n \cdot x_{i-n} - y_i \right\}^2$$

Then, an impulse series $h_n$ is determined so as to minimize this error E. In this embodiment, the least squares method is applied so that the above-mentioned equation (7) is partially differentiated with respect to the impulse series $h_n$ as:

$$\frac{\partial E}{\partial h_n} = 2 \sum_{i=-1}^{+m} \left\{ \sum_{n=-k}^{+k} h_n \cdot x_{i-n} - Y_i \right\} x_{i-n} \quad (8)$$

$$= 0$$

Substituting $n=-k, -(k-1), \ldots, 0, \ldots, +(k-1), +k$ into the above equation (8) yields the following simultaneous equations:

$$\begin{bmatrix} \sum_{i=-1}^{+m} \chi_{i+k}^2 & \sum_{i=-1}^{+m} \chi_{i+k}\chi_{i+k-1} & \cdots & \sum_{i=-1}^{+m} \chi_{i+k}\chi_{i-k} \\ \sum_{i=-1}^{+m} \chi_{i+k-1}\chi_{i+k} & \sum_{i=-1}^{+m} \chi_{i+k-1}^2 & \cdots & \sum_{i=-1}^{+m} \chi_{i+k-1}\chi_{i-k} \\ \cdots & \cdots & \cdots & \cdots \\ \sum_{i=-1}^{+m} \chi_{i-k}\chi_{i+k} & \sum_{i=-1}^{+m} \chi_{i-k}\chi_{i+k-1} & \cdots & \sum_{i=-1}^{+m} \chi_{i-k}^2 \end{bmatrix} \begin{bmatrix} h_{-k} \\ h_{-k+1} \\ \cdot \\ h_{+k} \end{bmatrix} = \begin{bmatrix} \sum_{i=-1}^{+m} \chi_{i+k}Y_i \\ \sum_{i=-1}^{+m} \chi_{i+k-1}Y_i \\ \cdot \\ \sum_{i=-1}^{+m} \chi_{i-k}Y_i \end{bmatrix} \quad (9)$$

The coefficient matrixes in the above simultaneous equations (9) become symmetrical matrixes so that calculations for each element need not be carried out for all elements. Further, in order to solve the above simultaneous equations, the coefficient matrixes are resolved in an LU fashion. The transmission line characteristic estimation unit 4 according to this embodiment can determine the channel response with high accuracy by the above-mentioned means.

A rest of the arrangements is formed similarly to that of the Viterbi equalizer shown in FIG. 1 and therefore need not be described in detail.

The signal processing flow of the Viterbi equalizer according to this embodiment will be described with reference to FIG. 11.

Referring to FIG. 11, following the start of operation, when the reception signal data $Y_k$ is supplied to the input terminal 1, the sync. pattern portion is detected at step S31. The detection of the sync. signal pattern portion is carried out by correlating the reception data $Y_k$ with the sync. signal pattern previously stored.

Then, in step S32, an impulse response between a transmitter and a receiver is modelled in the transmission line characteristic estimating unit 4 by using a method of least squares on the basis of a reference signal of the sync. signal pattern portion thus detected. Then, the channel response is estimated in step S33.

Then, the branch metric calculating circuit 21 calculates the branch metric in step S34, and the processing proceeds to step S35, where the calculation of N'th state is started.

In step S36, an address of a state-1 that is one time slot before is set. Then, the processing proceeds to step S37, where the path metric stored in the path metric memory circuit 23 at its address thus set is read out. Then the read out path metric and the branch metric calculated at step S34 are added by the ACS circuit 22, and the added output is stored in a register P1 in step S38.

In step S39, an address of a state-2 of one time slot before is set. Then, the processing proceeds to step S40, where a path metric stored in the path metric memory circuit 23 at its set address is read out. In the next step S41, this path metric is added to the branch metric calculated at step S34 by the ACS circuit 22, and the added output is stored in a register P2.

In the next steps S42 and S43, the values stored in the registers P1, P2 are compared and selected by the ACS circuit 22. Then, the value thus selected is output at step S44. In step S45, the path metric memory circuit 23 is updated by this selected value, and the path memory 26 is also updated by this selected value at step S46.

In the next decision step S47, it is determined whether or not the processing from step S35 to S46 is carried out $2^{k-1}$ times. If a NO is output at decision step S47, then the processing returns to step S35. If on the other hand a YES is output at decision step S47, then the processing proceeds to step S48, where a path having the minimum path metric value is detected by the maximum likelihood path detection circuit 25. In the next step S49, a normalization is effected by subtracting the minimum value of the path metric from each of the path metric amounts.

In step S50, an address of a maximum likelihood path is set by the maximum likelihood detection circuit 25. In the next step S51, the content of the path memory 26 is output as decoded data.

According to the first embodiment, since the impulse response between the transmitter and the receiver is modelled by using the sync. signal pattern portion as the reference signal, there is then the advantage that the impulse response between the transmitter and the receiver can be modelled uniquely.

Furthermore, according to the second embodiment of the present invention, since the transmission line characteristic is estimated by using the method of least squares in the transmission model and the error of the model becomes minimum, there is then the advantage that a satisfactory equalizing characteristic can be obtained.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A Viterbi equalizer, comprising:
   (a) synchronizing signal data detecting means for detecting only a synchronizing signal data portion from a reception signal data series;
   (b) transmission line characteristic estimating means for modeling an impulse response between a transmitter and a receiver by comparing only the synchronizing signal data portion detected by said synchronizing signal data detecting means with a reference signal;
   (c) decoding means for decoding the reception signal data series by using a Viterbi algorithm on the basis of the modeled impulse response obtained from said transmission line characteristic estimating means; and
   (d) a normalization circuit means for avoiding an overflow which takes place when a path metric is calculated in an error correction process utilizing the Viterbi algorithm.

2. The Viterbi equalizer according to claim 1 wherein said transmission line characteristic estimating means employs a method of least squares when the modelled impulse response between the transmitter and the receiver is obtained by comparing said synchronizing signal data portions with said reference signal.

3. The Viterbi equalizer according to claim 1 wherein said transmission line characteristic estimating means estimates a transmission line characteristic by correlating a synchronizing signal actually received with a known synchronizing signal pattern within a receiver in advance.

4. The Viterbi equalizer according to claim 1 wherein said decoding means calculates a branch metric of said Viterbi algorithm on the basis of said modelled impulse response obtained from said transmission line characteristic estimating means.

5. The Viterbi equalizer according to claim 1 wherein said decoding means calculates a branch metric of said Viterbi algorithm on the basis of said modelled impulse response obtained from said transmission line characteristic estimating means, and said decoding means calculating a path metric by using said calculated branch metric.

* * * * *